April 6, 1965 L. J. BAUGER ETAL 3,176,463
FLIGHT CONTROL AND STABILIZATION BY HOT JETS, APPLICABLE
IN PARTICULAR TO AIRCRAFT TAKING OFF VERTICALLY
WITHOUT CHANGE OF ATTITUDE
Filed Sept. 25, 1961 2 Sheets-Sheet 1
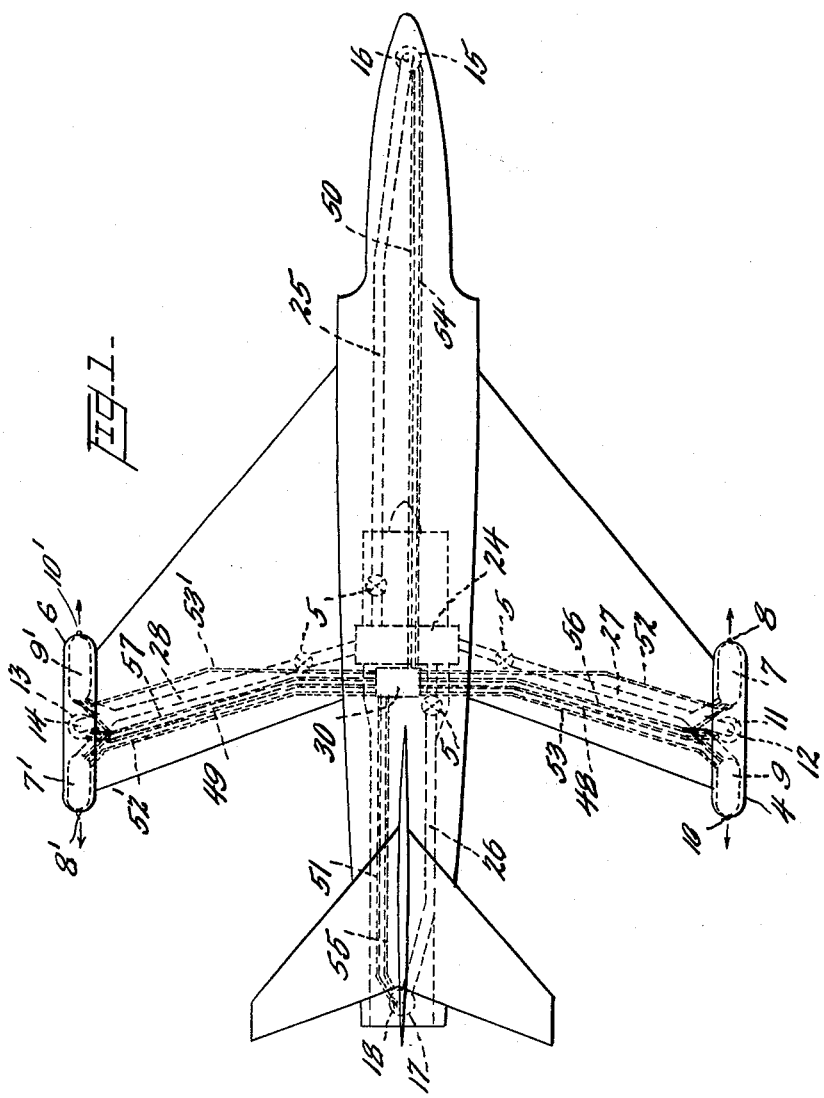
INVENTORS
Louis J. Bauger
Louis F. Jumelle
BY Watson, Cole, Grindle & Watson
ATTORNEYS

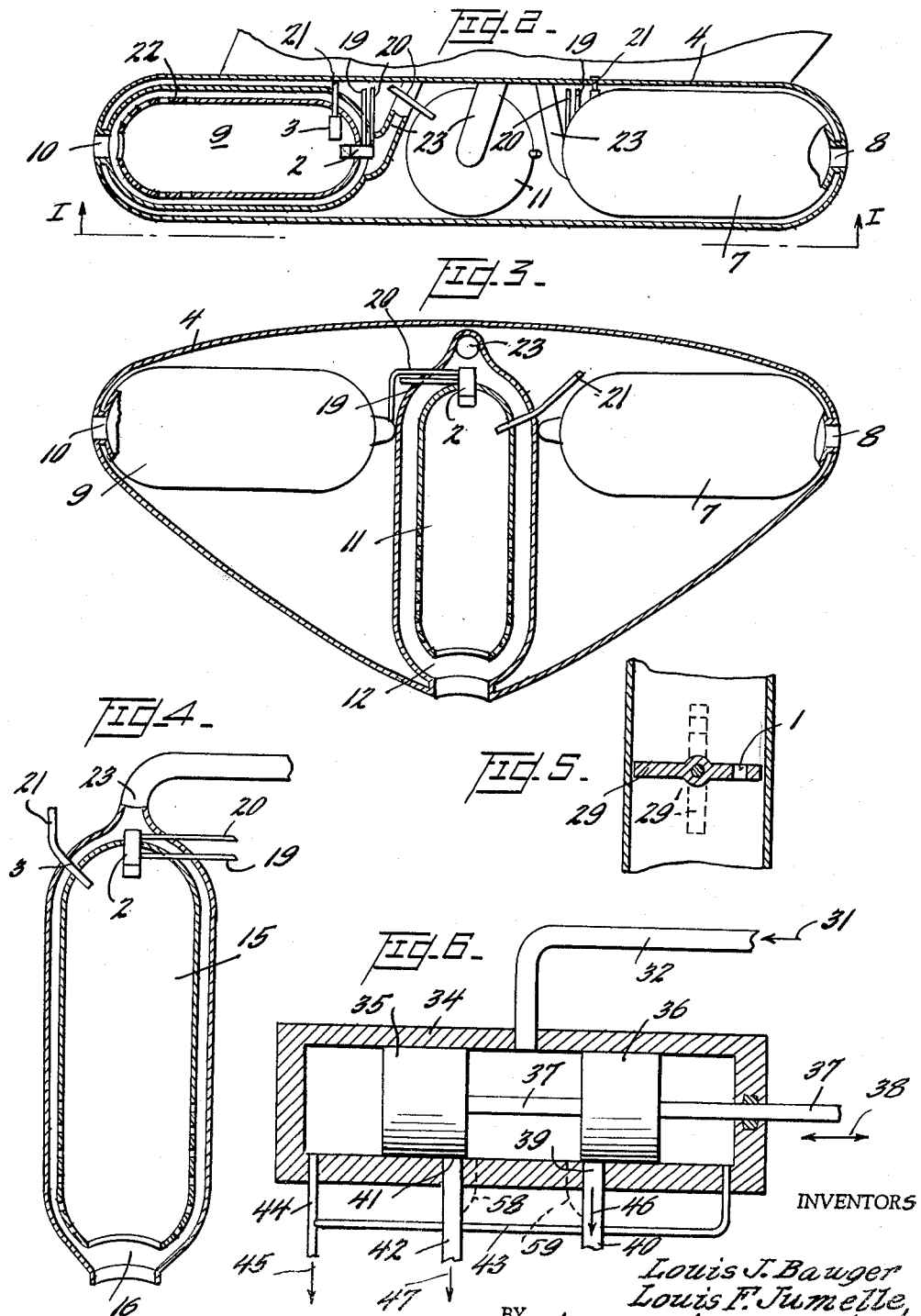

United States Patent Office 3,176,463
Patented Apr. 6, 1965

3,176,463
FLIGHT CONTROL AND STABILIZATION BY HOT JETS, APPLICABLE IN PARTICULAR TO AIRCRAFT TAKING OFF VERTICALLY WITHOUT CHANGE OF ATTITUDE
Louis Jules Bauger, Vanves, Seine, and Louis François Jumelle, Paris, France, assignors to Societe Nationale d'Etude et de Construction de Moteurs d'Aviation, Paris, France, a company of France
Filed Sept. 25, 1961, Ser. No. 140,349
Claims priority, application France, Sept. 27, 1960, 839,633, Patent 1,277,312
3 Claims. (Cl. 60—35.54)

This invention relates to the control of aircraft by means of auxiliary jets and more particularly to the stabilization about the roll, pitch and yaw axes of aircraft which take off vertically without change of attitude.

With reference to a flight control system by jet deflection, comprising a plurality of nozzles designed to operate selectively, the invention consists in ensuring a continuous flow of air through these nozzles and in associating them to different reheating chambers, the dissymmetry required to achieve control being obtained by igniting one of the chambers while the others remain extinguished or in pilot operation only. In an alternative embodiment of the invention, all the chambers are ignited during take-off and landing, the dissymmetry required to achieve control being obtained by the differential heating of associated pairs of chambers.

In the case of a vertical take-off aircraft (hereinafter referred to as a VTO aircraft), particularly of the type in which take-off or landing take place without change of attitude, a powerful thrust is required in conjunction with the lowest possible weight. One of the best ways of satisfying this requirement is by the use of by-pass turbojets, namely turbojets which supply a relatively large cold flow at fairly low pressure, an example of such a turbojet being the type of engine known as a turbofan. It does not necessarily follow that the heating of such a cold flow will provide a substantial gain in thrust, owing to the complications and above all the weight, size and heat insulation penalties that would be incurred if the heated gas were to be conveyed over a relatively large distance from the aircraft powerplant or powerplants.

In what follows, the description given by way of example refers to such a turbofan, but it is manifest that, without departing from the scope of the present invention, the same principles and details may be applied to other powerplants suitable for VTO, examples being ordinary turbojets (without fan), turboprops, and the like.

In the case of a VTO aircraft it is furthermore necessary to provide stabilization jets which create the control couples required during the take-off, transition and landing phases. This applies equally to the roll, pitch and yaw axes in the case of an aircraft taking off vertically without change of attitude, and in all cases to the roll axis in the case of type of VTO aircraft known as a "tail sitter." The control couples in pitch and yaw may be obtained by other conventional means if desired.

Provision is therefore usually made for by-passing part of the compressed air and directing it into ejection nozzles which are suitably located so as to generate the required control moments as far as possible from the centre of gravity of the aircraft. To reduce the space occupied by the lines used to deliver this by-pass air to the ejection nozzles, it is preferable to bleed this air at a relatively high stage of compression in order to ensure a minimum relative loss of charge in such unavoidably long air lines and permit the use of lines of smaller diameter. In this way the control nozzles are supplied with a relatively low mass flow of high pressure air which, from the energy standpoint it is undoubtedly preferable to heat prior to ejection. Furthermore, this will enable less air to be bled from the compressor for a given control thrust magnitude, and hence a much smaller proportion of the main lifting thrust to be lost.

In addition, such controls call for a progressive variation—to be controlled by the pilot or by a stabilization channel—of the distribution of the control thrust between the front and rear of aircraft (pitch), the port and starboard sides (roll), and the directions tangential to the wingtips or to the ends of the fuselage (yaw). The foregoing applies to an aircraft taking off vertically without change of attitude, but similar reasoning may be applied to a "tail sitter," at any rate insofar as roll is concerned. Such a progressive variation in the control thrusts could concievably be achieved by exclusively regulating the flight control ejection nozzles, in which case the latter would be adjustable to permit a discharge rate of from 0 to 100%; this, however, would lead to an inordinately complex nozzle design. It is therefore necessary to deliver the air to the control nozzles through the medium of a progressive type of multiple distributor which (associated to fixed flight control ejection nozzles for the three aircraft axes to be controlled) unavoidably generates losses in control thrust and which involves heavy size and weight penalties, due to the fact that it is called upon to distribute relatively large air mass flows.

The present invention enables this limitation to be circumvented by the injection of fuel into individual combustion chambers located immediately upstream of each flight control nozzle. For, indeed, were recourse to be had only to the high pressure air supplying the control nozzles as a whole, this would immediately offer the possibility, as already explained, of increasing the overall thrust provided by the controls without increasing the bleed air from the compressor. The invention, on the other hand, enables each control thrust to be varied progressively by suitably operating on the quantity of fuel injected into each individual combustion chamber, without the need for a progressive air distributor. It should be noted that this regulation method is roughly self-regulating from the standpoint of quantity of air bled from the compressor. For a temperature rise in one of the individual chambers tends to increase the volumetric rate of ejection without increasing the mass flow of the air supplied; on the contrary, since the volumetric rate of flow is restricted by the configuration of the individual combustion chamber and especially of the associated fixed ejection nozzle, such a temperature rise in fact creates a thermal obstruction tending to reduce the mass flow of air supplied to the chamber. Indeed a temperature rise in one of the combustion chambers increases the thermal obstruction and therefore slightly reduces the rate of air flow through the nozzle while at the same time increasing its speed and thereby causing the control thrust to augment.

In addition, the regulation mechanism used for each aircraft axis may be markedly reduced in weight and size since all that is required is to control (through manual action by the pilot or through a stabilization channel) the quantity of fuel injected into the several combustion chambers. The corresponding valves hooked up to the flight controls or the stabilization channel will therefore be disposed on the fuel circuitry and, though they will naturally require to be progressive, will be of much smaller size and weight than the valves that would have to be used on unheated air to ensure an equivalent degree of stabilization.

It is to be noted that, since the system operates close to the ground only during take-off and landing, no serious problems arise in connection with flame reliability over the fairly wide range of mixture strengths involved: the control thrust from each nozzle could be obtained, say, with a mean temperature rise of the order of 600 to 700° C. (in order to leave a margin either way), actual regulation taking place within limits of ±200° C. for example. A maximum combustion temperature of 800 to 900° C. would appear to be entirely admissible since there are no moving parts and the maximum temperature will be held only for the space of time of a control command, i.e. for the relatively short time of a few seconds at the most, actual operating time, be it at mean or extreme temperature, being in fact limited in the course of a flight to short periods of the order on one minute for take-off and for landing.

As already stated, since air at relatively high pressure is involved, the air lines will be of small diameter for a given control thrust magnitude. The combustion chambers will evidently be of larger size than the air lines but will nevertheless remain within acceptable limits; they may be heat-insulated with advantage.

The chambers will obviously comprise an igniter for starting-up before take-off and, if necessary, for relighting in flight. However, for increased landing safety, provision may be made for a pilot flame designed to remain alight throughout the flight. The air supply to the flight control nozzles will naturally be shut off during conventional flight, with the exception of an idling air jet of very small size to keep the pilot flame alight.

It should further be noted that, in cases where unheated air is used as the motive power to achieve control in flight, as is the case with the controls of certain VTO aircraft, a roll control for example will increase the air bleed and consequently reduce the main thrust. This is particularly serious owing to the upsetting couple which occurs during acceleration, due to the fact that the thrust diminishes (or at any rate increases at a lesser rate), since, in order to correct the upsetting couple, more control air must be bled. The invention overcomes this drawback since, on the contrary, the desired counterbalancing action about either the pitch, yaw or roll axis is obtained by increasing the throttling (by thermal obstruction) on the required side, i.e. by reducing—or at any rate not increasing—the quantity of air bled for stabilization purposes. Indeed, it would be quite possible to devise a roll control, say, so that it is operated by a slide-valve which delivers fuel preferentially to one side or the other, while at the same time ensuring, by imparting a suitable shape to the needle or the ports, that the obstruction level for any two complementary nozzles is maintained or even augmented during the time the control operates. During this time, the main thrust will not diminish and may even increase slightly.

The invention offers the added advantage of procuring shorter response times: an increase in the amount of fuel injected is reflected by an immediate increase in the control thrust, due to the incompressibility of the fuel. With unheated air, on the contrary, allowance must be made for the flow time through the lines, between the moment the central distributor is actuated and the moment when the flow modified thereby reaches the nozzles (unless provision is made for a multiplicity of valves very close to the control nozzles, which would still further increase the weight and size drawbacks and necessitate the use of a highly complex and heavy remote synchronization system).

The description which follows with reference to the accompanying drawings, given by way of example and not of limitation, will give a clear understanding of how the invention may be practiced, such particularities as emerge from the drawings or the description naturally falling within the scope of the invention.

In the drawings,

FIG. 1 is a highly diagrammatic plan view of an aircraft equipped with a stabilization system according to the invention.

FIG. 2 is a plan view on a larger scale of a wingtip fairing with the upper part of its cowling removed, the combustion chamber on the left-hand side of the figure being shown in section.

FIG. 3 is a view in elevation, along the line I—I in FIG. 2, with the lateral cowling removed, the combustion chamber lying along the vertical axis of the figure being represented in section.

FIG. 4 is an axial section through a pitch control combustion chamber.

FIG. 5 is a highly schematic axial section of an air control valve.

FIG. 6 is an axial section through a fuel distributor.

Referring now to FIG. 1, the roll and yaw jet ejection devices are accommodated in two wingtip fairings 4 and 6 positioned symmetrically in relation to the aircraft centerline. The wingtip fairing 4, which is shown in greater detail in FIGS. 2 and 3, comprises a forward combustion chamber 7 extended by an ejection nozzle or pipe 8, a rear combustion chamber 9 extended by an ejection nozzle or pipe 10 and vertical combustion chamber 11 extended by a downwardly directed ejection nozzle or pipe 12. Similarly, the wing tip fairing 6 comprises a forward combustion chamber 9' with its ejection nozzle 10', a rear combustion chamber 7' with its ejection nozzle 8', and a vertical combustion chamber 13 with its ejection nozzle 14. It will be appreciated that the simultaneous ejection of jets through the yaw nozzles 8 and 8' will produce a yawing couple tending to turn the aircraft to starboard and that, conversely, the simultaneous ejection of jets through the yaw nozzles 10 and 10' will tend to turn the aircraft to port. Similarly, discharging a jet through the roll nozzle 12 will tend to bank the aircraft to port and, conversely, a jet through the roll nozzle 14 will tend to bank the aircraft to starboard. The combustion chamber 15 and its downwardly directed ejection pipe or nozzle 16 are located at the front of the aircraft; the combustion chamber 17 and its likewise downwardly directed ejection pipe or nozzle 18 are located at the rear. FIG. 4 is an axial section through one such combustion chamber. The ejection nozzles 16 and 18 are the pitch nozzles, and it will be seen that a jet discharged through the front nozzle 16 will induce a nose-up attitude in the aircraft and that, conversely, a jet discharged through the rear nozzle 18 will induce a nose-down attitude.

Each combustion chamber 7, 7', 9, 9', 11, 13, 15, 17 comprises analogous members which may be seen in the sectional representations of FIGS. 2, 3 and 4: a two-flow injector 2, the fuel required for pilot-flame operation being conveyed through the line 19 and fuel for power operation through the line 20; an igniter plug 3 with its electrical supply lead 21; a flame tube 22; and an air distributor manifold 23. Each combustion chamber may evidently be provided with heat insulation (not shown). It will be appreciated that when such a chamber is supplied with fuel at a low rate of flow through the line 19 and with air through the manifold 23, it will operate in the throttled-down condition; if, however, through means to be described hereinafter, air at high pressure is delivered into the manifold 23 and fuel at variable rate of flow into the line 20, then the chamber will flare into power operation and the gas exhausting through its extension pipe will produce a jet resulting in a thrust that is an increasing function of the rate of flow of the fuel delivered through the line 20 and injected by the injector 2; moreover, the temperature rise in the combustion chamber causes an obstruction in the supply of air (due to the fixed geometry of the ejection nozzle 8, 10, 8', 10', 12, 14, 16 or 18), this reduction in the rate of air flow being an increasing function of the temperature rise in the combustion chamber and hence of the rate of fuel flow through the line 20. The igniter plug 3, the supply lead 21 of which is connected by any convenient means (not shown) to a suitable source of electric current, serves to ignite the pilot frame before take-off, when the supply of air through the manifold 23 is reduced and the fuel flows at a slow rate through the line 19 to the injector 2. The igniter plug 3 may be used, if necessary, for in-flight relighting in the event of accidental flame-out.

It should, however, be noted that, since operation of the system for take-off and landing takes place exclusively in proximity to the ground, no serious problems can arise as regards flame reliability in the several combustion chambers, over a fairly wide range of mixture strengths. This in turn permits very substantial variations in the rate of fuel flow through the lines 20 for variation of the control or stabilization thrusts, without running any danger of extinction in flight.

The compressed air supplying the manifolds 23 of combustion chambers 7, 7', 9, 9', 11, 13, 15 and 17 is bled from the main manifold 24, which is itself supplied with air bled from the high pressure stage of the compressor in the turbojet powering the aircraft. From the main manifold 24 four lines 25, 26, 27 and 28 lead up to the respective manifolds 23 supplying air to the front (15) and rear (17) pitch control chambers, to the roll (11) and yaw (7 and 9) chambers of the starboard wingtip fairing, and to the roll (13) and yaw (7' and 9') chambers of the port wingtip fairing. Each of these four lines 25, 26, 27, 28 comprises a valve 5, a longitudinal section of which is illustrated schematically in FIG. 5. This valve 5, which is operated by one of the flight controls (not shown), consists basically of a butterfly throttle 29 drilled with a small hole 1 and operates on the "all-on nearly-off" principle: when the throttle is in position 29, the hole 1 allows just enough air to pass to permit pilot operation of the combustion chamber or chambers being supplied; when the throttle occupies position 29', the combustion chamber or chambers supplied receive the high pressure delivery from the main manifold 24. It would evidently not be departing from the scope of the invention to provide, in lieu of four valves, a single valve such as 5 which would be inserted, say between the main manifold 24 and a secondary manifold connected directly to the combustion chambers.

Fuel to the combustion chamber injectors 2 is delivered by means of distributors similar to the one shown in FIG. 6, such distributors being preferably grouped together at 30. Each distributor operates in the following manner: fuel under pressure (represented by the arrow 31) is delivered by the pipe 32 into the cylinder 34, between the two piston-heads 35 and 36 which are rigidly interconnected by a rod 37 which is itself hooked up to a flight control symbolized by the arrows 38; by uncovering more or less one of the two ports 39 or 41 the piston-heads will uncover, to a corresponding degree, the passage section offered to the fuel into the pipe 40 or 42. The tubes 43 and 44 collect such fuel as may have leaked into the chambers to the right and to the left of the piston through defective sealing round the heads 35 and 36, and this fuel is led into a drianage pipe (schematically illustrated by the arrow 45) which returns it to the fuel tank, say; the packing gland prevents fuel leaks round the rod 37. As shown in FIG. 6 in solid lines, the distributor cannot uncover the ports 39 and 41 simultaneously, thereby ensuring that the pipes 40 and 42 can be supplied with fuel alternately only, the rate of flow through whichever of the two is receiving fuel being a function of the loss of charge produced by the degree of uncovering of the corresponding port.

Three distributors such as that illustrated in FIG. 6 are grouped together at 30: one for roll, another for pitch and the third for yaw. On the roll distributor, the arrows 46 and 47 schematically represent the connections, made via the lines 48 and 49 respectively, between the pipes 40 and 42 respectively of said distributor and the "power feed rate" supply lines 20 to the injectors 2 in the roll control combustion chambers 11 and 13 respectively. Similarly, in the case of the pitch distributor, the arrows 46 and 47 schematically represent the connection, via the lines 50 and 51 respectively, between said distributor and the "power feed rate" lines 20 to the pitch control combustion chambers 15 and 17 respectively. In the case of the yaw distributor, the arrow 46 schematically illustrates the supply in parallel, via the lines 52 and 52', to the "power feed rate" lines 20 leading to the yaw control combustion chambers 7 and 7', while the arrow 47 schematically illustrates the supply in parallel, via the lines 53 and 53', to the "power feed rate" lines 20 leading to the yaw combustion chambers 9 and 9'.

Also located at 30 is a pressurized-fuel manifold (not shown) which continuously supplies the "pilot feed rate" lines 19 leading to the injectors 2 of all the combustion chambers, via the pipes 54 for chamber 15, 55 for chamber 17, 56 with its three branch lines for chambers 7, 9 and 11, and 57 with its three branch lines for chambers 7', 9' and 13.

Operation of the system is as follows:

Before take-off, after the aircraft turbojet has been started up, the main manifold 24 receives the pressure of the air supplied by the compressor; the throttles in the valves 5 are placed in position 29, and the lines 25, 26, 27 and 28 supply all the combustion chambers with air passing through the holes 1. The fuel is set under pressure and the pipes 54, 55, 56 and 57 supply the lines 19 to the injectors 2 of all the combustion chambers at the "pilot feed rate"; the three fuel distributors will then be in the configuration shown in FIG. 6, so that their ports 39 or 41 will be completely masked and the fuel will be prevented from reaching the "power feed rate" lines 20 to the combustion chamber injectors 2. These chambers are then all ignited in pilot operation by means of the igniters 3.

At take-off, on landing, or during the transition phase from vertical to horizontal flight or vice versa, the turbojet supplies the lift and propulsion nozzles (not shown). Should a requirement for control or stabilization arise the pilot's manual controls or the stabilization channel are used to actuate the valves 5 and to thereby progressively actuate the fuel distributors grouped together at 30, so as to obtain the desired control or stabilization thrust, either in pitch via the pipes 16 or 18, in roll via the pipes 12 or 14, or in yaw by the combined action of the jets discharged simultaneously through the pipes 8 and 8' or 10 and 10'. If, for instance, the aircraft should have a tendency to nose down, the valve 5 on the line 25 will be opened to supply compressed air to chamber 15, while at the same time the pitch control fuel distributor will be operated progressively so as to uncover the port 39 by an amount just sufficient to obtain, in the pipe schematically illustrated by the arrow 46' and in the pipe 50, a rate of fuel flow such that, after the fuel has been injected by the injector 2 and ignited by the pilot flame, a temperature rise is produced in the chamber 15 such that the gas escaping through the ejection pipe 16 produces a jet the thrust of which corrects the aircraft's attitude.

It will be noted that the magniude of this correcting thrust depends only on the rate at which fuel is injected into the chamber 15, due to the fact that no alteration is made to the air pressure in the line 25; this rate of flow (and hence the aforementioned correcting thurst) can be adjusted very progressively and with a high degree of accuracy by the distributor shown in FIG. 6. It will further be noted that, as indicated above, the throttling caused by the temperature rise in the chamber 15 reduces the rate at which compressed air flows through the line 25, and that this rate of flow will be all the lower as the temperature rise and the resulting correcting thrust are greater. The rate at which compressed air is bled from the main manifold 24 to the detriment of propulsive thrust therefore decreases as the corrective thrust increases, so that there is no danger of diminished propulsive thrust when it is necessary to resort to powerful corrective thrusts.

Whenever it is necessary to produce a control or stabilization thrust or couple—either about the roll axis with nozzles 12 or 14, about the yaw axis with nozzles 8 and 8′ or 10 and 10′, or about the pitch axis with nozzles 16 or 18—the control procedure will be similar to that just described in cases where the aircraft tends to assume a nose-down attitude, using the valves 5 and the fuel distributors.

After take-off the pilot shuts off the "power feed rate" fuel supply 20 to the injectors, leaves on the "pilot feed rate" supply 19 (preferred procedure) and closes the valves 5. For the remainder of the flight the latter will be in the "nearly-off" position, while the chambers will remain in pilot operation, being supplied with air through the orifice provided for the purpose in the butterfly throttle 29 and with fuel through the lines 19 to the two-rate injectors.

Prior to landing, the pilot again opens the valves 5 and the "power feed rate" fuel supply, the rest of the control procedure being absolutely identical to the take-off procedure as described before.

In an alternative embodiment of the invention, and in order to further reduce the rate of air flow required by the aircraft controls (and, by correlation, to reduce the corresponding losses of propulsive thrust in the lift jet or jets), the distributor 6 is designed so that, when it is in the neutral position (no corrective thrusts applied), fuel is delivered at a very considerable rate into the lines 46′ and 47. This can be achieved by imparting a suitable shape to the distribution sleeve ports, an example being the shape shown diagrammatically in dotted lines in FIG. 6 (reference numerals 58 and 59). In this way, a moderate temperature rise can be obtained for the control air, resulting for instance in an ejection temperature of about 600 to 700° C. Displacement of the control slide-valve with a view to obtaining the desired control action (in response to a command from the pilot or the stabilization channel) then results in a rise in the temperature of one of the chambers, chamber 11 say, in conjunction with a drop in the temperature of the associated chamber, chamber 13 say. By way of indication and as stated precedingly, it is possible to "superheat" up to 800 or 900° C. on one side and "underheat" the associated chamber to 400 or 500° C. As a result, the thrust increases on the superheated side and decreases on the underheated side, thereby creating the desired control couple. At the cost of a slight increase in fuel consumption (though only during the short vertical take-off and landing phases), this particular embodiment of the invention enables the air bleed rate from the main turbojet to be reduced, and hence also the propulsion losses due to such bleeding. It should in fact be noted that, in this alternative arrangement, the bleed rate remains virtually constant provided that appropriate shaping of the ports enables the increased throttling on one side to compensate for the reduced throttling in the associated chamber from the air mass flow standpoint.

It is to be noted that, in the embodiment described hereinabove, the combustion chambers used for yaw control are arranged in pairs, to wit 7 and 7′ on the one hand and 9 and 9′ on the other, the two chambers of a pair being ignited simultaneously and the thrusts resulting therefrom forming couples which are in no danger of upsetting the balance of the aircraft. The combustion chambers for pitch control 15 and 17 and their ejection nozzles 16 and 18 are located on the aircraft's centerline, so that their operation cannot upset the equilibrium of the aircraft either. In contradistinction, in the arrangement shown in FIG. 1, the roll control combustion chambers 11 and 13 and their ejection nozzles 12 and 14 are not symmetrically located in relation to the centre of gravity of the aircraft. The rolling thrusts which they produce in operation consequently introduce a pitching moment which must be corrected, for instance by providing for automatic coupling of the fuel supply controls to the chambers 11 and 13 with the fuel supply controls to the chamber 15. The drawing is in fact given by way of example only to illustrate the manner of heating the stabilization jets to ensure that, for a given control thrust magnitude, the amount of air bled from the compressor is reduced. The disposition adopted for the combustion chambers and their ejection nozzles can consequently differ without departing from the scope of the invention. Assuming an appropriate wing shape, a roll control nozzle disposition could be chosen which would not introduce a pitching moment.

Moreover, it will be observed that the roll and pitch nozzles 12, 14, 16 and 18 contribute to lift, whereas, on the contrary, the yaw control nozzles 8, 8′ and 10, 10′ produce a null resultant thrust since they are arranged in opposing pairs—except when used as a flight control, in which case they generate a couple only, the other pair of nozzles then having rather unfavorable effects. It might be of advantage and would manifestly not be departing from the scope of the present invention to apply the latter exclusively to pitch and roll nozzles and to retain conventional means for the yaw controls, an example being the discharge of a cold flow without the heating disclosed in the present invention, or any other means well known per se.

It is to be clearly understood that the present invention applies also to VTO aircraft of the tail sitter type (except that, obviously, the words "roll" and "yaw" must be transposed in the foregoing description) and generally speaking, covers the use of a heated auxiliary stabilization jet for the in-flight control of an aircraft about one or more of its three axes.

What is claimed is:

1. In an aircraft having a propulsion power unit incorporating a compressor having a high pressure stage, a reaction flight control and stabilization system comprising at least one pair of complementary nozzles and controlled feed means for feeding the same with gas to produce jets for rotating the aircraft in opposite directions about a flight control axis thereof, said feed means comprising separate combustion chambers each delivering its exhaust gases to one of said nozzles, duct means for bleeding compressed air from the high pressure stage of said compressor to deliver said compressed air to both associated combustion chambers at a substantially constant flow during operation of the device, fuel supply means for supplying fuel to each combustion chamber, ignition means in each combustion chamber, and a regulating device correlating the relative rates of fuel supply to the respective chambers, to selectively increase the rate of fuel supply to one said chamber, while maintaining the rate of fuel supply to the other said chamber substantially at a minimum.

2. In an aircraft having a body and propulsion power means, a flight control and stabilization system operating at least during take-off and landing of the aircraft, comprising a source of compressed air aboard the aircraft, duct means individual to each nozzle for delivering said compressed air at a substantially constant flow to a plurality of nozzles spaced on the aircraft body, heating means in said duct means, and control means for selectively operating said heating means to heat to relatively different temperatures, said compressed air delivered to the respective nozzles, whereby each nozzle ejects a jet having a thrust which is controlled solely by said heating means, the nozzles being adapted to achieve said flight control and stabilization by variation in their relative thrusts.

3. A method of flight control and stabilization of an aircraft, comprising the steps of:

(a) at least when a control moment around a flight control axis of the aircraft is likely to be wanted, feeding a substantially constant flow of compressed air to each jet of at least one pair of complementary jets discharging in parallel directions, which are spaced on both sides of said flight control axis, (b) when said control moment is actually wanted, heating to different temperatures the compressed air which is fed to the respective jets of said pair, and (c) controlling said heating selectively to produce said moment.

References Cited by the Examiner

UNITED STATES PATENTS

| | | | |
|---|---|---|---|
| 2,451,008 | 10/48 | Williams | 244—52 |
| 2,679,726 | 6/54 | Moncrieff | 60—35.6 |
| 2,726,510 | 12/55 | Goddard | 60—35.54 |
| 2,856,754 | 10/58 | Torell | 60—39.28 |
| 2,870,978 | 1/59 | Griffith et al. | |
| 2,950,763 | 8/60 | Bennett | 60—39.82 X |
| 3,008,672 | 11/61 | Moore et al. | 244—52 X |
| 3,018,068 | 1/62 | Frost et al. | 244—52 X |

FOREIGN PATENTS

| | | |
|---|---|---|
| 1,068,404 | 2/54 | France. |
| 610,143 | 10/48 | Great Britain. |
| 713,783 | 8/54 | Great Britain. |
| 851,153 | 10/60 | Great Britain. |

SAMUEL LEVINE, *Primary Examiner.*

ANDREW H. FARRELL, ABRAM BLUM, *Examiners.*